INVENTOR.
ALEX SPYCHALLA

April 6, 1954 A. SPYCHALLA 2,674,130
PORTABLE MACHINE TOOL
Filed Dec. 19, 1952 3 Sheets-Sheet 2
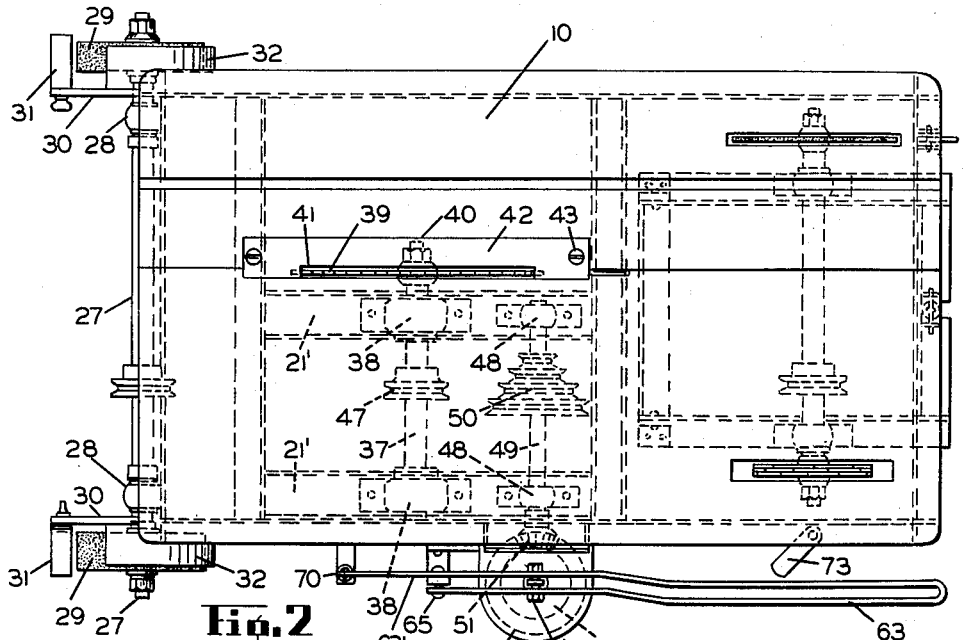
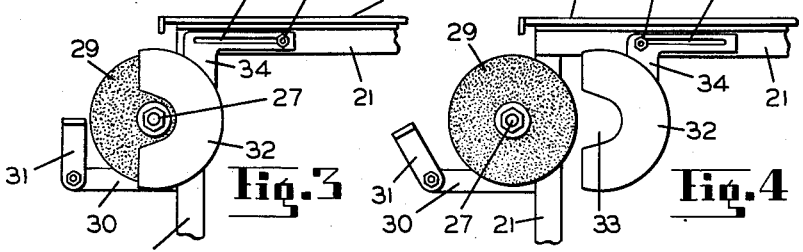
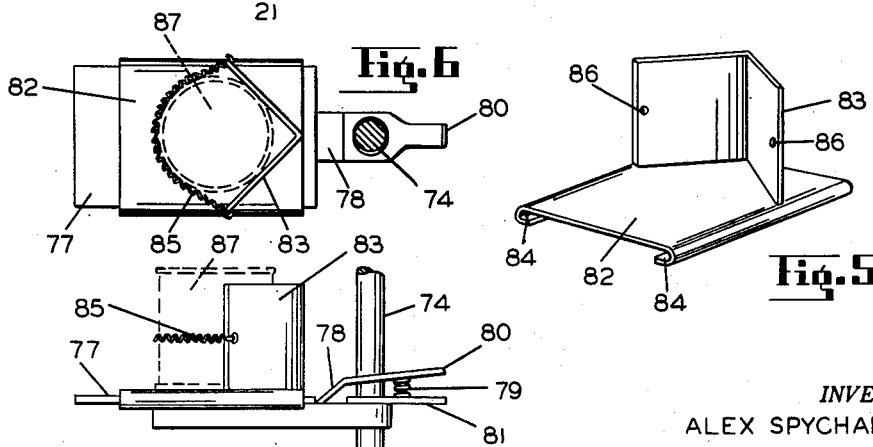
INVENTOR.
ALEX SPYCHALLA
BY
Christian R. Nielsen
ATTORNEY.

April 6, 1954 A. SPYCHALLA 2,674,130
PORTABLE MACHINE TOOL
Filed Dec. 19, 1952 3 Sheets-Sheet 3
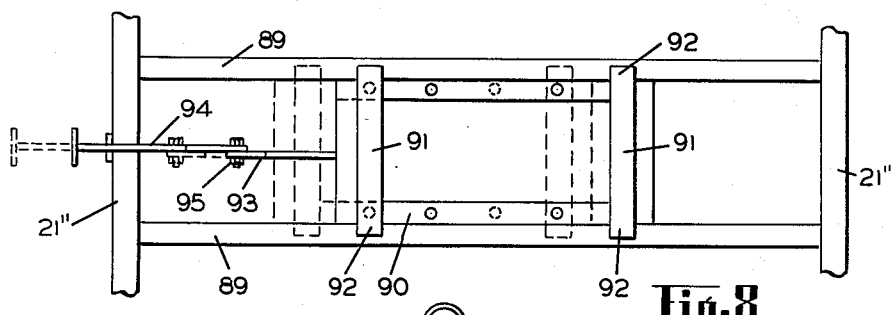
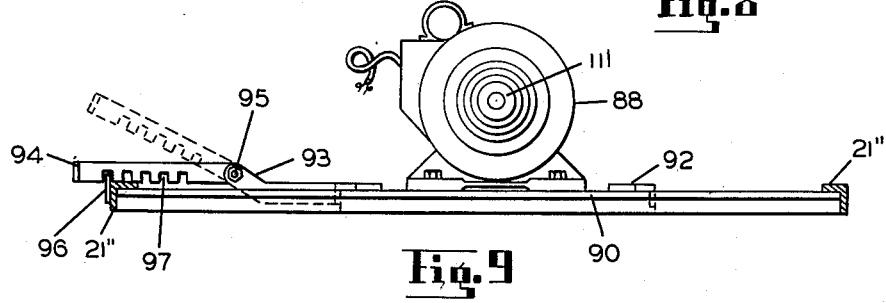
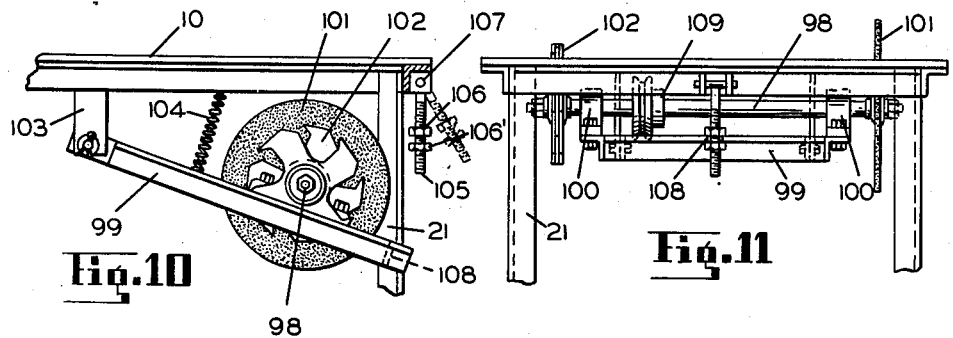
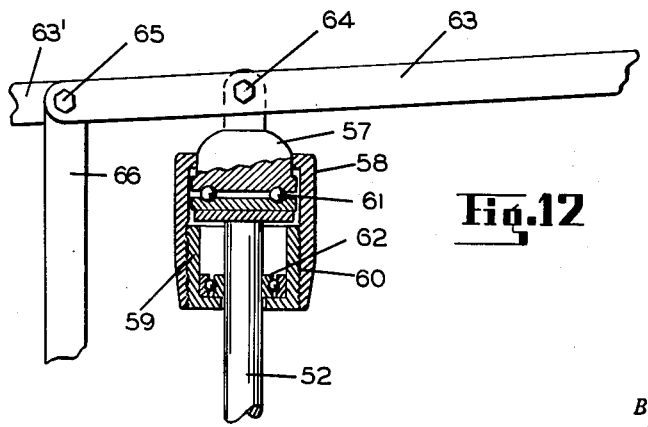
INVENTOR.
ALEX SPYCHALLA
BY
ATTORNEY.

Patented Apr. 6, 1954

2,674,130

UNITED STATES PATENT OFFICE 2,674,130

PORTABLE MACHINE TOOL

Alex Spychalla, Milwaukee, Wis.

Application December 19, 1952, Serial No. 326,838

4 Claims. (Cl. 74—16)

My invention relates to portable machine tools, and more particularly to a portable work table equipped with various machine tools.

The object of my invention is to provide a single, mobile unit incorporating a plurality of machine tools mounted thereon, in a manner whereby any single tool may be operated and used independently of the others.

Another object of my invention is to provide a unit of the character described supporting an actuating means accessible for actuating said machine tools one at a time.

Still another object of my invention is to so arrange the various machine tools on the work table, that one will not interfere with the other during their operation.

A further object of my invention is to construct a unit in a manner whereby each individual machine tool becomes a definite integral part of the portable work table.

It is manifest to anyone familiar with the art, that hobbyists as well as home mechanics, have use for varied types of machine tools for different operations, and that it is often times impossible and impractical to mount them independently and separately due to the lack of space or mounting facilities. It is therefore advantageous to assemble the various machine tools onto a single work bench that is mobile and may be moved from one location to the other for convenience, as well as making it possible to store the unit in an out-of-the-way location.

The device as illustrated, specified, and claimed herein is safe, sturdy, efficient and easy to manipulate, inasmuch as separate machine tools operate independently of each other.

Other and further objects of my invention will become more apparent as the description proceeds, when taken in conjunction with the drawings in which:

Figure 2 is a top or plan view of the device as illustrated in Figure 1.

Figure 3 is a side view of one of the grinding wheels partially protected by a guard.

Figure 4 is a similar view of the grinding wheel as shown in Figure 3, but showing the guard moved out of engagement with the wheel, and the hand or tool rest pivotally adjusted in a forward position to permit disengaging and changing the wheel.

Figure 5 is a perspective view of the paint- mixer slide showing the upwardly projecting support.

Figure 6 is a top view of the drill press table with the paint mixer slide in position thereon.

Figure 7 is a side elevation of the table and slide arrangement as shown in Figure 6.

Figure 8 is a top or plan view of the motor mounting assembly.

Figure 9 is a side view of the assembly as shown in Figure 8 with the motor mounted thereon.

Figure 10 is a side fragmentary view of the tip-table arrangement for the routing saw and the sanding disc.

Figure 11 is an end view of the main table and tip-table arrangement, and

Figure 12 is a cross-sectional view of the upper end of the drill press spindle.

Figure 1:
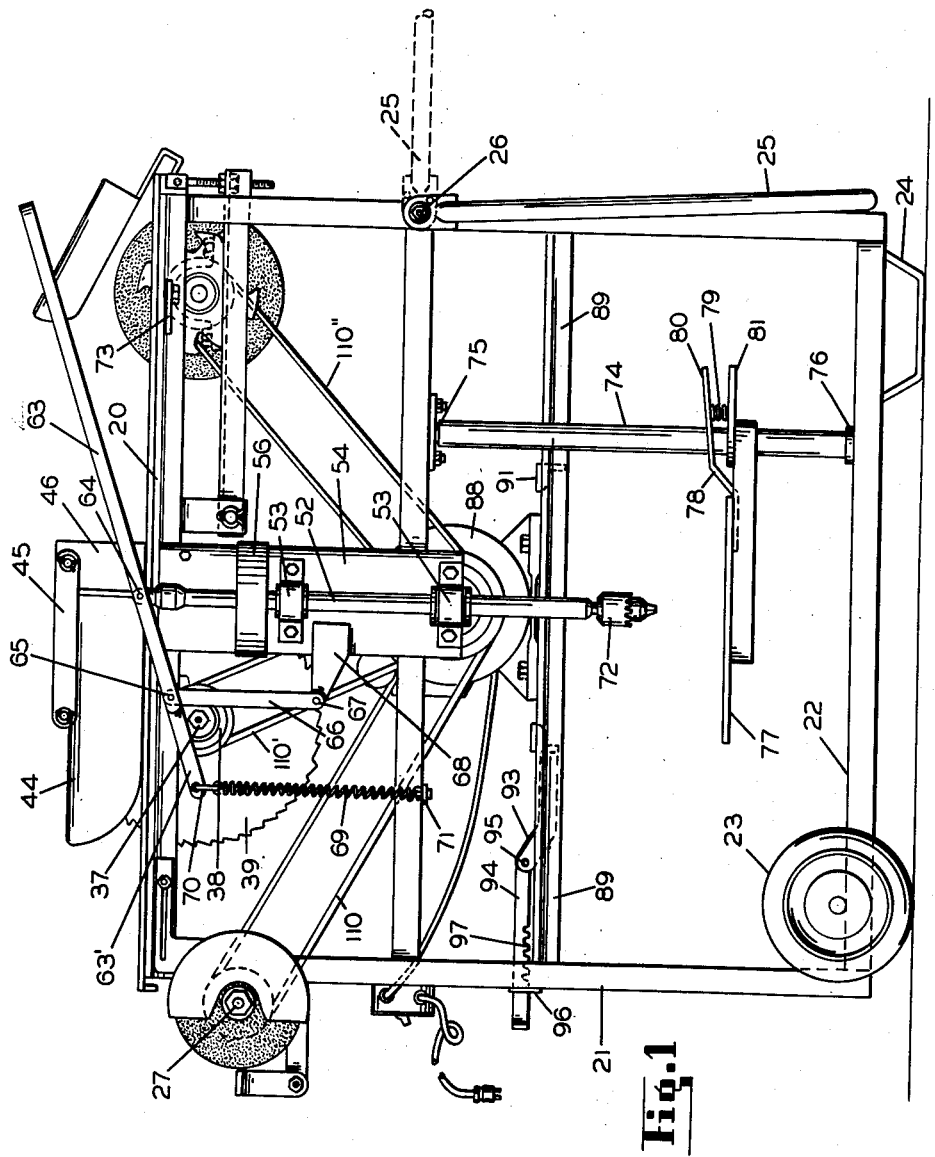
Figure 1 is a side elevation of the assembled unit, illustrating the arrangement and mounting of the various machine tools constituting the device.

Similar characters of reference indicate corresponding parts throughout the several views, and referring now to the same, the table top is identified by the character 20. This table top is horizontally disposed and mounted on a structural frame 21 consisting of vertical members, longitudinal members, and lateral members. This structural frame 21 has also a lower frame 22 onto which are mounted a pair of wheels 23 at the forward end, and at the rearward end of the lower frame 22 is shown a pair of skids 24 for frictional engagement with the floor to keep the entire mobile structure from "creeping" or moving while the machine tools are being operated. The structural frame 21 is also provided with a handle 25 pivotally attached at 26 to the frame 21 at the rearward end thereof. This handle 25 may be folded vertically as shown in Figure 1, or may extend outward in a horizontal position as shown in phantom in Figure 1.

There is a horizontal shaft 27 journalled in bearings 28 attached to the forward portion of the structural frame 21. This horizontal shaft 27 is provided with polishing or grinding wheels shown as 29 at both ends of the shaft 27, and the shaft 27 is set low enough on the structural frame 21 so that the top of the wheels 29 will not interfere with the surface of the table top 20. This is shown in Figures 3 and 4. There is a steady rest or tool support 30 attached to the frame 21. This support has a pivoted forward portion 31 which is used to support the tools or the like (not shown), and there is a guard 32 of semi-circular contour which is open at its forward end 33 and has an angular bracket 34 equipped with a slot 35, and a bolt 36 is attached to the frame structure 21, extending outward therefrom through the slot 35 to permit the adjustment of the guard 32. These guards 32, obviously, are constructed in a right and left hand manner for mounting on the respective sides of the structural frame 21.

There is another shaft 37 which is journalled in bearings 38 which are attached to the supports 21' forming an integral part of, and attached to the bottom of the table top 20. This shaft 37 is shown with a circle saw 39 attached to its inwardly disposed end 40. The saw 39 extends upward through a slot 41 in a plate 42, which plate is attached to the top of the table 20 by means of screws 43 or in any other convenient manner. I also show a guard 44 mounted on a link lever 45 which is supported by means of a vertical thin plate 46 extending upward through the slot 41 in direct alignment with the saw blade 39, and permits the saw to be used with safety, the guard member 44 raises and lowers according to the thickness of the work piece being worked on. This shaft 37 is further provided with a grooved pulley shown as 47 which is attached to the shaft 37 at a point between the bearings 38.

The supports 21' also act as a means for attaching a pair of bearings 48 into which a shaft 49 is horizontally journalled, and by which it is supported. Between the bearings 48, I show a step pulley 50, and the outer end of the shaft 49 is equipped with a bevel pinion 51.

There is a vertical shaft 52 slidably journalled in bearings 53 which are attached to a vertical plate 54 which is supported by the longitudinal cross members forming a portion of the structural table support. A beveled gear 55 is attached to the vertical shaft 52, and the beveled pinion 51 on the horizontal shaft 49 is brought into engagement with the beveled gear 55, and the gear and pinion are enclosed within a guard or enclosure shown as 56.

The upper end of the vertical shaft 52 is provided with a bearing unit 57, as shown in Figure 12, which unit has an outer shell 58 and an inner shell 59 which threadedly engage one another at 60 for retaining the thrust bearing 61 in position. The thrust bearing 61 is attached to the upper end of the vertical shaft 52, which shaft is guided within the inner shell 59 by the ball bearing assembly shown as 62. The upper portion 57 is pivotally connected to a handle 63 at 64 supported at 65 by a link member 66, which link is hingedly attached at 67 to a bracket 68 forming a part of the vertical plate 54. The handle 63 is also provided with an extended portion 63', and an expansion spring 69 is shown supported at this outward end 70 to the extended portion 63' and attached at its other end to the frame structure at 71. The link and lever assembly permits raising and lowering the vertical shaft 52, which is also provided at its lower end with a chuck assembly 72, which chuck assembly 72 may be of any conventional type. The pivoted cam 73 attached to the bottom of the table top 20 is employed to hold the handle 63 in a downward position against the tension of the spring 69.

There is a tubular member 74 shown extending vertically in parallel relation to the shaft 52. This tubular member 74, which obviously may be of a solid structure, is attached at its top 75 and its bottom 76 to the structural frames 21 and 22, and is employed as a support for an adjustable platform or table shown as 77, which is rotatably and slidably attached to the tubular member 74 by means of a resilient lever 78 which is actuated against the pressure of the spring 79 when the two outwardly extending ends 80 and 81 are brought toward one another, thereby permitting the raising and lowering of the table 77 or pivoting it to any position below the chuck 72 on the vertical shaft 52.

In Figures 6 and 7, I show the table 77 attached to the tubular member 74. Obviously, as stated above, this tubular member may be a solid bar if desired. The table 77 in Figures 6 and 7, is equipped with a slide member 82 which has an angular member 83 vertically disposed on its upper face. The channels 84 forming a part of the slide member 82 engage the outer end of the table 77, and a spring 85 engages the apertures 86 in the angular member 83 for the purpose of supporting a can of paint or the like shown as 87 in phantom. When a mixing blade (not shown) is inserted into the chuck 72, the table 77, with the can 87 is supported thereon as shown in Figures 6 and 7, may be easily manipulated and brought to a position whereby the mixing blade may be entered into the top of the paint can. By revolving the vertical shaft 52, the auxiliary blade (not shown) will agitate the paint.

In Figures 8 and 9, I illustrate an adjustable support for the motor which is shown as 88 and which actuates the various tools by means of belts. The motor mounting consists of a pair of rails 89 attached to the cross members 21'' forming a part of the structural support for the table top 20. These rails 89 support a slidable mounted carriage 90 on top of which the motor 88 is attached. The carriage has laterally disposed members 91 which have their outwardly extending ends 92 resting on top of the rails 89. The forward end of the carriage 90 is provided with a bracket 93 to which a link lever 94 has a plurality of open slots 97 for engagement with the member 96 when slidably moving the carriage 90, and retaining it in a fixed, predetermined position, thereby holding a tension on the belts which bring the individual machine tools into contact with the actuating means on the motor.

The laterally disposed shaft 98, supported horizontally on a tip table 99, is journaled in bearings 100 as shown in Figures 10 and 11, and support a sanding disc 101 on one end, and a joiner blade 102 on the other end. This tip table 99 is hingedly mounted to downwardly extending members 103 and is held in a position by means of a resilient member or spring 104 attached to the tip table 99 and to the frame 21 on the bottom of the surface plate 20. A rearward end of the structure 21 is provided with a bolt member 105, provided with two nuts 106—106'. This bolt member 105 is hinged at 107 to the structure 21, and the rearward end of the tip table 99 has an open slot 108 disposed therein, which accommodates the bolt 105 when the table is raised in a horizontal position as shown in Figure 11, at which time, the nuts 106 and 106' are adjusted upward and downward, and retain the sanding disc 101 or the joiner blade 102 in a raised position at a pre-determined height. Obviously, when the sanding disc 101 is used, the tip table 99 is brought to a higher level, and when the joiner blade 102 is used, the sanding disc 101 is removed from the shaft 98, and the tip table 99 is adjusted to a pre-determined height by the nuts 106 and 106' so that the joiner blade extends to the correct height above the surface plate 20.

Each one of the individual machine tools is actuated by means of a belt, and the shaft 98 supporting the sanding disc 101 and the joiner blade 102 is also provided with a grooved pulley 109 spaced between the two bearings 100 on the tip table 99. As the belts, shown as 110, 110' and 110'' are put into engagement over the motor pulley 111, and the driven pulley on the various shafts, the various machine tools become actuated to perform their particular function. It is only necessary to engage or disengage the belts from the pulleys in order to make the machine tool active or inactive, and only one tool at a time can be used. Obviously, the movement of the carriage 90 on the rails 89 will permit adjustment, and increasing or diminishing the tension of the belts as they are applied to the motor pulley shown as 111. The adjustment of the various units is extremely simple, and the operation of the device does not require any mechanical skill as far as the engagement or disengagement of the actuating means or motor 88 from the particular machine tool that is to be placed into operation.

While I have shown a particular arrangement of a specific structure, I do not want to limit myself to the particular arrangement shown, for in the operation of my device, many changes in the form and configuration of the component parts may be made without affecting the operativeness of the device, and without departing from the spirit of my invention or the scope of the appended claims.

Having thus described my invention, what I claim and desire to secure by Letters Patent in the United States is:

1. A device of the character described comprising, a horizontal surface plate, a structural main frame supporting said surface plate, said frame mounted on wheels, horizontal shafts, one of said shafts journalled in bearings mounted on said frame, rotating tools rigidly mounted on said shafts, said surface plate equipped with longitudinal slots extending therethrough, each of said rotatable tools extending through one of said slots, an auxiliary frame being hingedly supported at one of its ends to the bottom of said surface plate, a horizontal auxiliary shaft rotatably mounted in bearings supported by said auxiliary frame, adjustable means attached to the frame supporting said surface plate for raising and lowering the free end of said auxiliary frame, said auxiliary shaft having rotating tools mounted thereon, said table equipped with additional elongated slots for the engagement of the rotating tools on said auxiliary shaft, a vertical shaft rotatably journalled in bearings mounted to the side of the structural main frame, means for driving said vertical shaft by means of said horizontal shaft, a second horizontal shaft journalled in bearings mounted on the vertical face of said main frame, rotating tools mounted on said second shaft, a vertical standard forming a part of said structural frame, a platform, said platform adjustably mounted on said vertical standard, a tool clamping chuck mounted on the lower end of said vertical shaft, a horizontally disposed carriage, said carriage adjustably mounted to said structural frame, a motor acting as an actuating means, said motor attached to said adjustable carriage, said motor equipped with a drive pulley, a driven pulley mounted on each of said horizontal shafts, and a plurality of individual belts to be manually placed into individual engagement with one of said pulleys and said motor drive pulley.

2. A device of the character described comprising, a horizontal surface plate, a main frame, said frame supporting said plate, said plate provided with a plurality of slots extending therethrough, an auxiliary frame hingedly supported at one of its ends to the bottom of said surface plate, a horizontal shaft mounted below said surface plate, said shaft journalled in bearings mounted on said main frame, rotating tools mounted on said shaft, said tools extending upward partially through slots in said surface plate, a horizontal auxiliary shaft journalled in bearings mounted on said auxiliary frame, rotating tools mounted on said auxiliary shaft, said tools disposed for engagement upward through the slots in said surface plate, means mounted on said main frame for adjustably raising and lowering the free end of said auxiliary frame, another shaft journalled in bearings mounted on the outside of said main frame, said shaft extending outward from and below said surface plate, a rotatable tool mounted at each end of said shaft, a vertical shaft slidably journalled in bearings mounted on said main frame, said vertical shafts having a beveled gear slidably mounted near its upper end, and a tool retaining chuck on its lower end, a beveled gear mounted on one end of the horizontal shaft mounted below said surface plate, said beveled gear disposed for engagement with the beveled gear near the upper end of said vertical shaft, an actuating means, a horizontal carriage slidably supported by said frame, means to control the longitudinal movement of said carriage, said actuating means mounted onto said carriage and equipped with a drive pulley, each of said horizontal shafts equipped with a driven pulley mounted thereon, and individual belts for engagement with said driven pulley one at a time with the drive pulley on said actuating means.

3. A device of the character described comprising, a horizontal surface plate, a structural main frame supporting said surface plate, four vertical standards forming a part of said frame, two of said standards provided with wheels, the other two of said standards provided with skids, horizontal shafts, said shafts journalled in bearings mounted on said frame, rotating tools mounted on said shafts, said surface plate equipped with longitudinal slots extending therethrough, said rotatably mounted tools each extending upward through one of said slots, an auxiliary frame hingedly supported at one of its ends to the bottom of said table, a horizontal auxiliary shaft rotatably mounted in bearings supported by said auxiliary frame, adjustable means attached to the frame supporting said surface plate for raising and lowering the free end of said auxiliary frame, said auxiliary shaft having rotatable tools mounted thereon, said table equipped with additional elongated slots for the engagement of the rotating tools on said auxiliary shaft, a vertical shaft rotatably journalled in bearings mounted on the side of said structural main frame, means for driving said vertical shaft by means of said horizontal shaft, means on said structural frame for vertically adjusting said vertical shaft, a second horizontal shaft journalled in bearings mounted on the vertical face of said main frame, rotating tools mounted on said second shaft, guard members mounted on said frame, said guard members adjustably supported and enclosing a portion of said rotating tools, a vertical standard forming a part of said structural frame, a platform, said platform adjustably mounted on said vertical standard, a tool clamping chuck mounted on the lower end of said vertical shaft, a channel member having upwardly disposed angular members, said channel slidably supported by said platform, a horizontally disposed carriage, said carriage adjustably mounted horizontally to said structural frame, an actuating means, said actuating means attached to said adjustable carriage and equipped with a drive pulley, each of said horizontal shafts equipped with a driven pulley, and a plurality of individual belts to be manually placed one at a time into engagement with one of said driven pulleys and the drive pulley on said actuating means.

4. A device as described in claim 3 in which the vertical standard forming a part of said frame is provided with an adjustable platform slidably supported by said vertical standard, said platform arranged for radial and vertical slidable adjustment below said vertical shaft, said platform equipped with a channel member slidably engaging said platform, said channel member equipped with a vertical angular member for the support of the work piece disposed thereon.

No references cited.